(12) United States Patent
Lourie et al.

(10) Patent No.: US 7,487,375 B2
(45) Date of Patent: Feb. 3, 2009

(54) METHOD AND APPARATUS FOR POWERING ON AN ELECTRONIC DEVICE WITH A VIDEO CAMERA THAT DETECTS MOTION

(75) Inventors: David S. Lourie, Portland, OR (US); Pedro E. Fajardo, Hillsboro, OR (US); Gunner D. Danneels, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 11/677,971

(22) Filed: Feb. 22, 2007

(65) Prior Publication Data

US 2007/0136774 A1 Jun. 14, 2007

Related U.S. Application Data

(62) Division of application No. 09/036,501, filed on Mar. 6, 1998, now Pat. No. 7,196,720.

(51) Int. Cl.
*G06F 1/32* (2006.01)

(52) U.S. Cl. .................. 713/323; 713/310; 713/320

(58) Field of Classification Search .......... 713/300–324
See application file for complete search history.

(56) References Cited

U.S. PATENT DOCUMENTS

| | | | |
|---|---|---|---|
| 5,440,369 A | 8/1995 | Tabata et al. |
| 5,455,561 A | 10/1995 | Brown |
| 5,471,239 A | 11/1995 | Hill et al. |
| 5,610,580 A | 3/1997 | Lai |

(Continued)

FOREIGN PATENT DOCUMENTS

CN 1090063 A 7/1994

(Continued)

OTHER PUBLICATIONS

PCT International Search Report (dated May 26, 1999), International Application No. PCT/US99/03765, International Filing Date Feb. 19, 1999, 6 pages.

(Continued)

*Primary Examiner*—Dennis M Butler
(74) *Attorney, Agent, or Firm*—Blakley, Sokoloff, Taylor & Zafman LLP

(57) ABSTRACT

A method and apparatus for controlling power up of an electronic device with a video camera is provided. The present invention provides for using a video camera attached to an electronic device, such as a computer system, to cause the electronic device to be powered up from sleep mode when motion is detected. The electronic device may also be powered up from being shut down. In one embodiment, the video camera includes a processor and memory that compare consecutive frames captured by the video camera. When the electronic device is in sleep mode, if consecutive frames are the same, the video camera continues to monitor the scene without generating an output signal. If the frames are different, motion is detected and the video camera generates a signal that is used to determine whether the electronic device should power up. In this manner, the electronic device may begin the powering up process before the user of the device interacts with the device.

11 Claims, 4 Drawing Sheets

U.S. PATENT DOCUMENTS

| | | | |
|---|---|---|---|
| 5,631,701 | A | 5/1997 | Miyake |
| 5,675,364 | A | 10/1997 | Stedman et al. |
| 5,731,832 | A | 3/1998 | Ng |
| 5,892,856 | A | 4/1999 | Cooper et al. |
| 6,005,613 | A | 12/1999 | Endsley et al. |
| 6,058,238 | A | 5/2000 | Ng |

FOREIGN PATENT DOCUMENTS

| | | |
|---|---|---|
| DE | 3842356 A1 | 6/1990 |
| DE | 4138254 C1 | 6/1993 |
| EP | 0701195 A1 | 3/1996 |
| JP | 07271482 | 10/1995 |
| JP | 08046925 | 2/1996 |

OTHER PUBLICATIONS

Non-Final Office Action (dated Mar. 26, 2002), U.S. Appl. No. 09/036,501, Filing Date Mar. 6, 1998, First Named Inventor: David S. Lourie, 11 pages.

Final Office Action (dated Oct. 2, 2002), U.S. Appl. No. 09/036,501, Filing Date Mar. 6, 1998, First Named Inventor: David S. Lourie, 13 pages.

Non-Final Office Action (dated Dec. 24, 2002), U.S. Appl. No. 09/036,501, Filing Date Mar. 6, 1998, First Named Inventor: David S. Lourie, 8 pages.

Non-Final Office Action (dated Feb. 9, 2006), U.S. Appl. No. 09/036,501, Filing Date Mar. 6, 1998, First Named Inventor: David S. Lourie, 10 pages.

Non-Final Office Action (dated Jun. 2, 2000), U.S. Appl. No. 09/036,501, Filing Date Mar. 6, 1998, First Named Inventor: David S. Lourie, 12 pages.

Final Office Action (dated Jan. 2, 2001), U.S. Appl. No. 09/036,501, Filing Date Mar. 6, 1998, First Named Inventor: David S. Lourie, 9 pages.

Non-Final Office Action (dated Jun. 18, 2001), U.S. Appl. No. 09/036,501, Filing Date Mar. 6, 1998, First Named Inventor: David S. Lourie, 9 pages.

Final Office Action (dated Oct. 10, 2001), U.S. Appl. No. 09/036,501, Filing Date Mar. 6, 1998, First Named Inventor: David S. Lourie, 11 pages.

METHOD AND APPARATUS FOR POWERING ON AN ELECTRONIC DEVICE WITH A VIDEO CAMERA THAT DETECTS MOTION

This is a divisional application of U.S. Ser. No. 09/036,501 filed Mar. 6, 1998 now U.S. Pat. No. 7,196,720.

FIELD OF THE INVENTION

The present invention relates to a video camera, and more specifically, to a video camera that causes an external device to power up in response to detecting motion.

BACKGROUND OF THE INVENTION

Electronic devices, such as computer systems, are typically placed in a sleep or other reduced power mode when input has not been received by the device for a predetermined period of time. Sleep mode allows the device to conserve power. For example, when a keyboard, mouse, or other input device to a computer system has not been used for 5 minutes, the computer system may reduce power to all non-essential functions. Some components, such as a processor may run at a reduced clock rate. Other components, such as hard disks, may be powered down completely until used or requested by the device. Only components, such as volatile memory, that are necessary to maintain the state of the computer system receive power to do so. The device remains in sleep mode until input is received that indicates that the device is being used.

In the prior art, computer systems are typically powered up from being shut down or placed in sleep mode by a user physically interacting with the computer system. When the user wishes to use a computer that had been shut down or placed in sleep mode, he or she has to go to the computer and push a button or move a mouse or other cursor control device to begin the powering up sequence. The user then must wait for the computer system to power up before the system can be used. Therefore, a need exists for a device that can begin the powering up sequence for a computer system or other electronic device before the user interacts with the device.

The prior art also includes video cameras for use with computer systems and other electronic systems. However, usage of video cameras with computer system has been limited to applications such as video conferencing, video recording, etc.

SUMMARY OF THE INVENTION

An apparatus that generates an output signal in response to a changing view is described. A memory stores frames that represent the view at particular times and a processor coupled to the memory compares a set of frames and generates the output signal in response to the set of frames differing by a predetermined amount. Reset circuitry coupled to the processor powers up an electronic device in response to the output signal generated by the processor.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
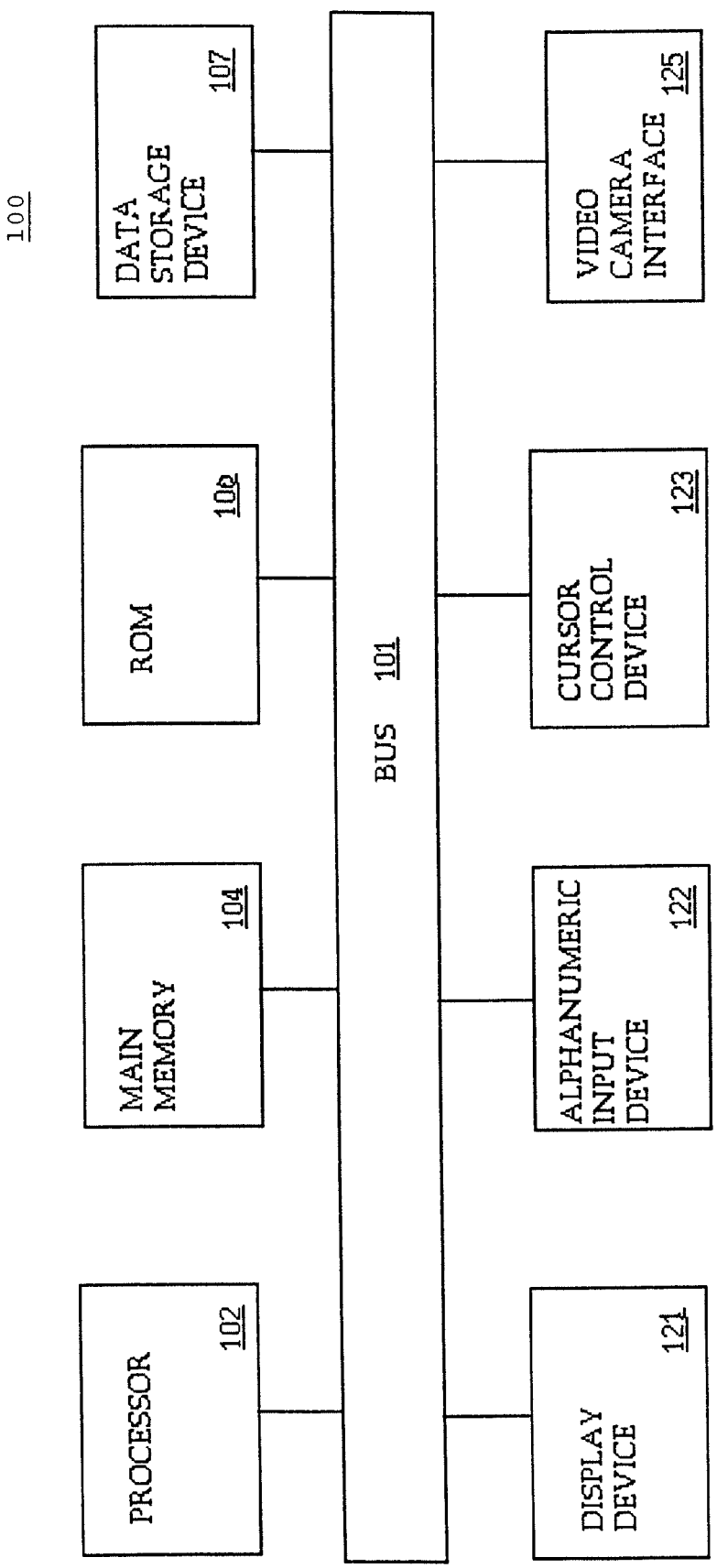
FIG. 1 is one embodiment of a computer system that may be powered up according to the present invention.

A method and apparatus for controlling power up of an electronic device with a video camera that detects motion is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention provides for using a video camera attached to an electronic device, such as a computer system, to cause the electronic device to power up from sleep mode or other reduced power state when motion is detected by the video camera. The electronic device may also be powered up from being shut down. In one embodiment, the video camera includes a processor and memory that compare consecutive frames captured by the video camera. When the electronic device is in sleep mode, if consecutive frames are the same, the video camera continues to monitor the scene without generating an output signal. If the frames are different, motion is detected and the video camera generates a signal, such as an interrupt, that is used to signal the electronic device to power up. In this manner, the electronic device may begin the powering up process before a user interacts with the device.

The present invention may be useful, for example with a personal computer system. The computer system goes into sleep mode when no input is received for a predetermined period of time. When the computer system is in sleep mode, a video camera coupled to the computer system monitors the scene captured by the video camera. In one embodiment, consecutive frames are compared by a processor in the video camera, using memory in the video camera, to determine whether motion has been detected. When motion is detected, a signal is sent to the computer system to begin powering up.

The computer system may then be at a password prompt or be powered up when the user arrives at the computer system. Alternative embodiments may also be provided where the processor is not included in the video camera. For example, a video interface, such as a video expansion card, may include a processor for comparing frames. Alternatively, a system processor may be used to compare frames.

Of course, the video camera may be used with electronic devices other than computer systems such as security systems, information displays, automated teller machines (ATMs), etc. In a security system, the present invention may be used to send a signal when motion is detected, for example, by an intruder. The security system may be powered up and receive video data from the video camera in response to motion being detected. In an information display or ATM, the system may be powered down until approached by a potential user. When the system detects the motion of a potential user, the information display or ATM is powered up.

FIG. 1 is one embodiment of a block diagram of a computer system that may be powered up according to the present invention. Computer system 100 comprises bus 101 or other communication device for communicating information, and processor 102 coupled to bus 101 for processing information. Computer system 100 further comprises random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises read only memory (ROM) and/or other static storage device 106 coupled to bus 101 for storing static information and instructions for processor 102. In one embodiment, processor 102 is a Pentium® processor II processor available from Intel Corporation of Santa Clara, Calif. Alternatively, processor 102 may be a different Intel Corporation processor or any other processor.

Data storage device 107 such as a magnetic disk or optical disc and corresponding drive can be coupled to bus 101. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Video camera interface 125 is coupled to bus 101 and provides an interface between computer system 100 and a video camera (not shown in FIG. 1). Video camera interface 125 causes computer system 100 to be powered up in response to motion being detected by the video camera. In one embodiment, video camera interface 125 includes circuitry that is not powered down when other components of computer system 100 are powered down. Video camera interface 125 remains powered up to process signals received from the video camera. When the video camera sends a signal to computer system 100 to indicate that motion has been detected, video camera interface 125 begins the powering up process. Powering up may be accomplished, for example, by applying a voltage to a power pin of processor 102 or in any other manner known in the art. Video camera interface 125 may also receive video data from the video camera. Alternatively, an interrupt line may be provided by which the video camera communicates a motion detect signal to computer system 100.

Figure 2:
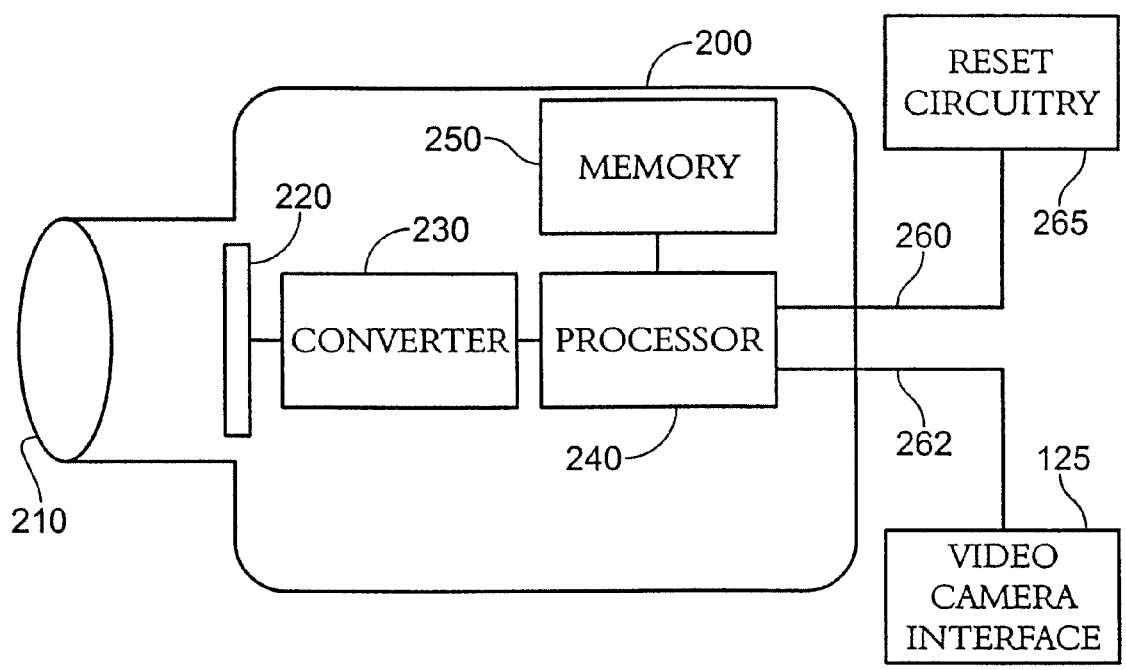
FIG. 2 is one embodiment of a video camera and computer system components that may be used to control power up of an electronic device according to the present invention.

FIG. 2 is one embodiment of a block diagram of a video camera for controlling power up of an electronic device according to the present invention. Generally video camera 200 includes hardware for converting a scene that may be seen through lens 210 of video camera 200 to a frame. Processor 240 compares consecutive frames to detect motion. An output signal, such as an interrupt, is generated in response to motion being detected.

A scene that may be seen through lens 210 is projected onto charge coupled device (CCD) 220, which senses the intensity of light and colors of the scene and provides raw image data as an output signal. CCD 220 outputs voltages that correspond to a two-dimensional array of pixels that represent intensities of brightness (luma) and color (chroma) of the scene. The voltages are converted to frames by conversion hardware/firmware 230 coupled to CCD 220 in any manner known in the art. Processor 240 receives frames from conversion hardware/firmware 230 and stores the frames in memory 250 coupled to processor 240.

In one embodiment, frames are stored in the YUV-9 format. Alternatively, the YUV-12 format or any other video format may be used. In one embodiment, only the luma, or Y, component of the video data, which corresponds to brightness is used to determine motion. In such an embodiment, the chroma, or U and V, components, which correspond to color are not used to determine motion.

In such an embodiment, the average brightness of a frame may be used for comparison purposes. If the average brightness of a consecutive frames is different by a predetermined amount, motion is detected. Alternatively, the brightness of different areas of the frame may be used to determine a weighted average for the luma value for each frame. When the weighted average of a subsequent frame is different by a predetermined amount, motion is detected. In one embodiment, the predetermined difference used to determine motion is configurable by a user of the electronic device prior to the device entering sleep mode.

In one embodiment, the rate at which processor 240 receives frames varies depending on the state of the electronic device. If the electronic device is in sleep mode or shut down, processor 240 receives frames at a lower rate than when the electronic device is powered up. For example, processor 240 may receive frames at a rate of 30 frames per second when the electronic device is powered up and 5 frames per second when the electronic device is not powered up. Of course, other frame rates may also be used. By reducing the frame rate and thus the rate of comparison, power consumed by processor 240 may be reduced as compared to higher frame rates.

Power-up line 260 is coupled to reset circuitry 265 to communicate an output signal (e.g., interrupt) to a processor when motion has been detected by video camera 200. In response to the output signal the processor begins power up of the electronic device. When the electronic device is powered up, video signals from video camera 200 may be communicated to the electronic device by frame line 262. Alternatively, power up line 260 may be coupled to video camera interface 125. In such an embodiment, video camera interface 125 includes reset circuitry 265 (not shown in FIG. 2).

In one embodiment, processor 240 and memory 250 in video camera 200 are used for video compression or other video processing when computer system 100 is powered up. When the electronic device goes into sleep mode, processor 240 and memory 250 switch from video compression or other processing to frame comparison. In one embodiment, video outputs that are generated and communicated via frame line 262 when the device is powered up is not generated when the electronic device is in sleep mode. Video camera 200 only generates an output signal over power-up line 260 when compared frames differ by a predetermined amount. When video camera 200 determines that subsequent frames are different, a power up interrupt is communicated to the electronic device to indicate that motion has been detected. The electronic device responds to the interrupt generated by video camera 200 by powering up.

Figure 3:
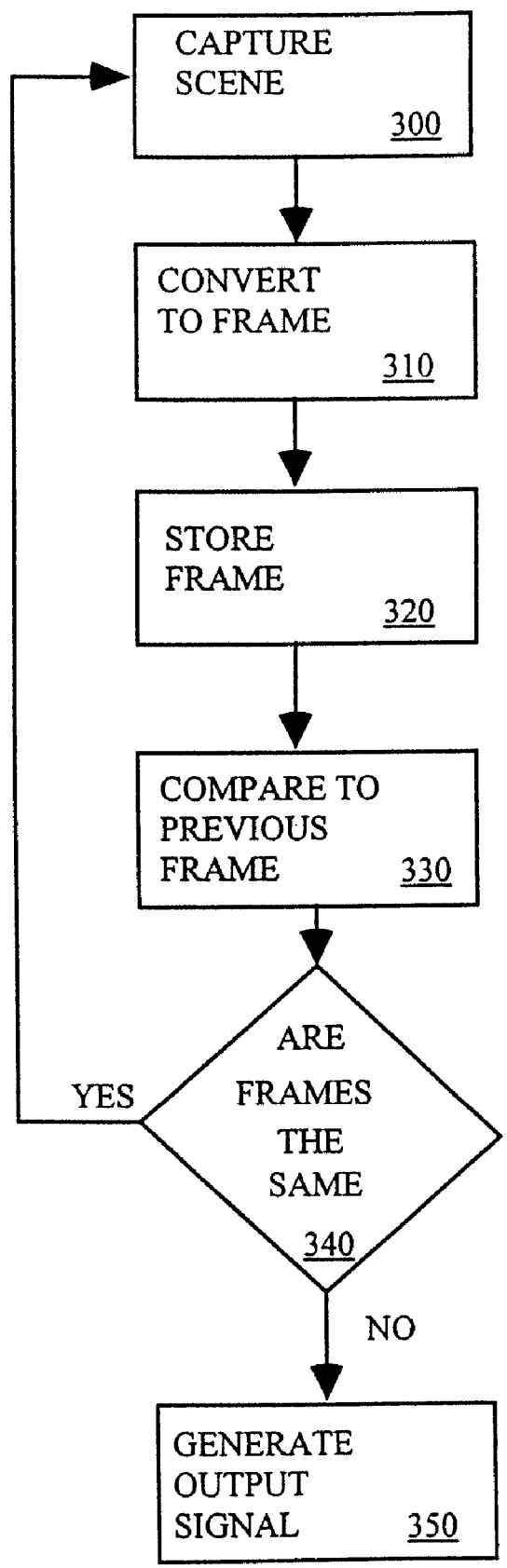
FIG. 3 is one embodiment of a flow diagram for controlling power up of an electronic device with a video camera according to the present invention.

FIG. 3 is one embodiment of a flow diagram for controlling powering up of an electronic device with a video camera. In step 300, the video camera captures a scene. The scene is encoded and framed in step 310. Encoding and framing is performed by any manner known in the art. As noted above the frame rate of the video camera may be reduced when the electronic device to which the video camera is connected is not powered up.

In step 320 the frame is stored in memory. In step 330, the frame stored in memory is compared to a previous frame stored in memory. In step 340, the video camera determines whether the frames that were compared are the same. If the frames are the same, the video camera returns to step 300 to continue capturing scenes, converting the scenes to frames and comparing frames.

If, in step 340, the frames compared are not the same, the video camera generates an output signal in step 350. The output signal is used to determine whether the electronic device should power up. In this manner, the video camera controls whether the electronic device is powered up.

Figure 4:
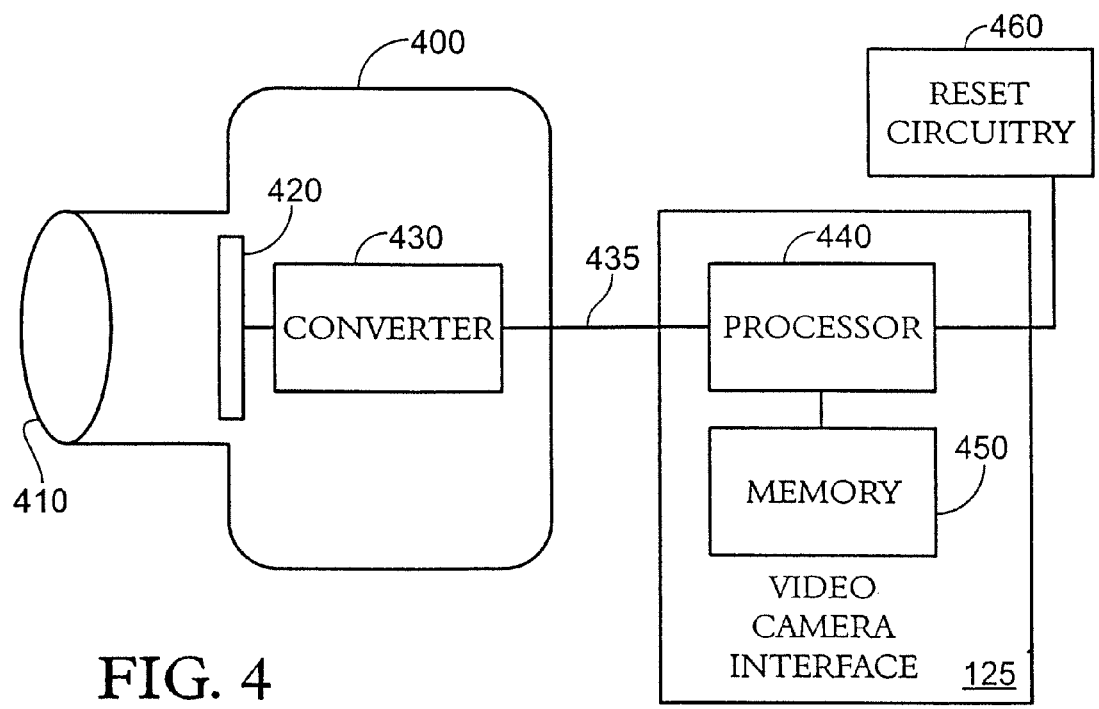
FIG. 4 is a first alternative embodiment of a video camera and computer system components that may be used to control power up of an electronic device according to the present invention.

FIG. 4 is a first alternative embodiment of a video camera and computer system components that may be used to control power up of an electronic device according to the present invention. The embodiment of FIG. 4 is similar to the embodiment of FIG. 2 except that processing takes place in the video camera interface rather than in the video camera, which results in a less expensive video camera than the embodiment of FIG. 2.

In the embodiment of FIG. 4, camera 400 generally comprises lens 410, which focuses a scene on CCD 420. Converter 430 receives the output signal from CCD 420 to encode and frame data output by CCD 420. The output of converter 430 is communicated to processor 440 via frame line 435. Processor 440 processes frames received from converter 430 as described above using memory 450 to determine whether motion is detected.

Processor 440 generates an interrupt or other output signal to reset circuitry 460 when motion is detected. Reset circuitry 460 resets an associated computer system or other electronic device (not shown in FIG. 4) in response to the interrupt received from processor 440. Alternatively, video camera interface 125 generates an interrupt that is communicated directly to an interrupt controller of a system processor (not shown in FIG. 4).

Thus, the embodiment of FIG. 4 provides a less expensive video camera than the embodiment of FIG. 2 because the video camera does not include a processor or memory. In such an embodiment, video camera interface 125 is not powered down when the associated computer system or other electronic device (not shown in FIG. 4) is powered down. In order to reduce power consumption when the electronic device is powered down, processor 440 may process frames at a lower rate than frames are provided by video camera 400. Alternatively, video camera 400 may reduce an output frame rate when the electronic device is powered down.

Figure 5:
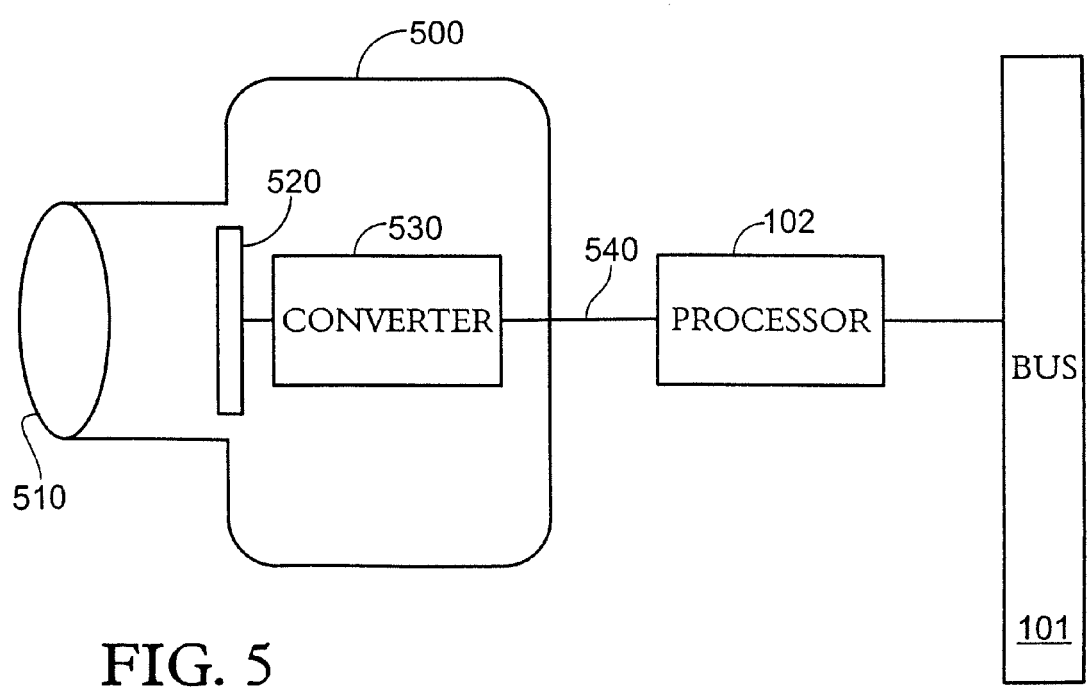
FIG. 5 is a second alternative embodiment of a video camera and computer system components that may be used to control power up of an electronic device according to the present invention.

FIG. 5 is a second alternative embodiment of a video camera and computer system components that may be used to control power up of an electronic device according to the present invention. The embodiment of FIG. 5 provides a direct connection between an external video camera and a system processor. Alternatively, the video camera may be coupled to a system or other bus to communicate with the system processor.

In one embodiment, video camera 500 includes lens 510, CCD 520 and converter 530 that function in a similar manner as lens 410, CCD 420 and converter 430 discussed above. The output of converter 530 is coupled to processor 102 via frame line 540. Alternatively, converter 530 may be coupled to bus 101 directly or though an interface via line 540.

The embodiment of FIG. 5 may provide a less expensive system than the embodiments of FIGS. 2 and 4. Of course, processor 102 provides enough processing functionality in addition to video processing to provide acceptable performance.

In one embodiment, when the electronic device is powered down processor 102 processes frames from video camera 500 at a rate that allows processor 102 to consume less power than when the electronic system is powered up. This may be accomplished, for example, by reducing the processor clock rate.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system comprising:
    a computer, the computer to transition from an active mode to a sleep mode in response to a predetermined period of computer inactivity; and
    a video camera coupled to the computer to detect motion, the video camera including a memory to store a plurality of frames corresponding to a view of an area proximate to the computer at different times and a processor coupled to the memory to compare two of the plurality of frames of the view to each other while the computer is in the sleep mode to determine whether there is motion proximate to the computer and to cause the computer to exit the sleep mode in response to detected motion proximate to the computer.

2. The system of claim 1, wherein the processor is to cause the computer to exit the sleep mode in response to the two frames differing by a predetermined amount.

3. The system of claim 1, further comprising reset circuitry coupled to the processor to power up the computer to exit the sleep mode.

4. The system of claim 1, wherein the computer is a personal computer (PC).

5. The system of claim 1, wherein the video camera is to capture frames when the computer is in active mode, at a different frame rate than when the computer is in sleep mode.

6. The system of claim 5, wherein the frame rate in sleep mode is lower than in active mode.

7. A method comprising:
    causing a computer to transition from an active mode to a sleep mode in response to a predetermined period of computer inactivity;
    capturing a first frame, in a video camera coupled to the computer, corresponding to a view proximate to the computer at a first time while the computer is in the sleep mode;
    capturing a second frame, in the video camera, corresponding to the view at a second time while the computer is in the sleep mode;
    determining whether there is motion proximate to the computer while the computer is in the sleep mode by determining whether the first frame differs from the second frame; and
    sending a signal from the video camera to the computer that causes the computer to exit the sleep mode, in response to motion detected proximate to the computer.

8. The method of claim 7, wherein determining whether there is motion proximate to the computer while the computer is in the sleep mode comprises determining by a processor internal to the video camera whether the first frame differs from the second frame by a predetermined amount.

9. The method of claim 7, wherein the video camera is to capture frames when the computer is in active mode, at a different frame rate than when the computer is in sleep mode.

10. The method of claim 9, wherein the frame rate in sleep mode is lower than in active mode.

11. The method of claim 8, wherein the determining comprises:

determining an average brightness of the first frame;

determining an average brightness of the second frame; and calculating a difference as a function of the average brightness of the first and second frames.

* * * * *